UNITED STATES PATENT OFFICE.

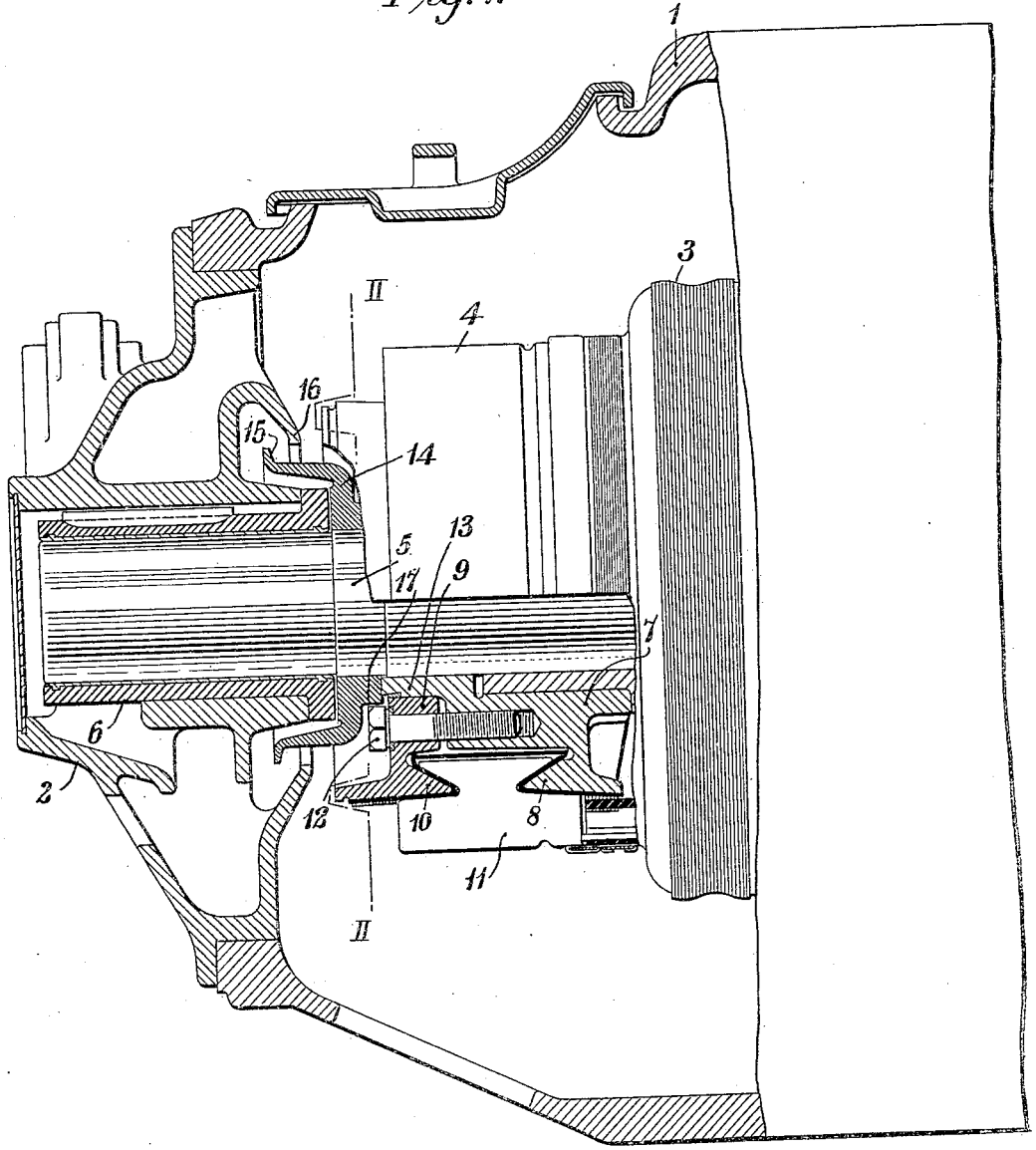

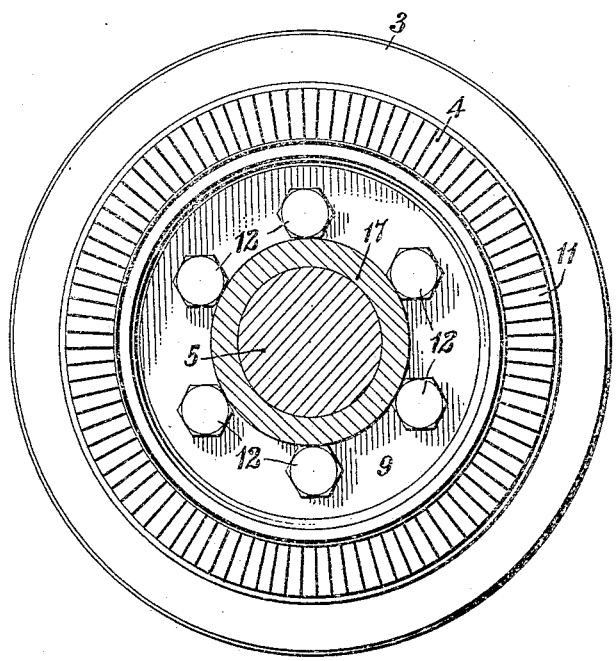

JOSEPH D. FORRER, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

DYNAMO-ELECTRIC MACHINE.

No. 931,116.     Specification of Letters Patent.     Patented Aug. 17, 1909.

Application filed October 7, 1908. Serial No. 456,532.

*To all whom it may concern:*

Be it known that I, JOSEPH D. FORRER, a citizen of the United States, and a resident of Pittsburg, in the county of Allegheny and State of Pennsylvania, have invented a new and useful Improvement in Dynamo-Electric Machines, of which the following is a specification.

My invention relates to dynamo-electric machines, and it has special reference to the mechanical construction of railway motors and similar machines of the commutator type.

The object of my invention is to provide improved means for protecting the commutators of machines of the class above indicated, from excess lubricating fluids in the adjacent shaft bearings and for locking the bolts which clamp the commutator segments in position.

Figure 1 of the accompanying drawings is a view, mainly in section, of a portion of a dynamo-electric machine constructed in accordance with my invention, and Fig. 2 is a sectional view on line II—II of Fig. 1 which discloses the method of locking the commutator-clamping bolts.

Referring to the drawings, the device illustrated comprises a stationary frame 1, a bearing housing 2 supported thereon, a rotatable armature 3 having a commutator 4, and a shaft 5 mounted in bearings 6 that are disposed in the housings 2, only one of which is disclosed. The commutator comprises a bushing 7 having a V-projection 8, a clamping ring 9 having a coöperating V-projection 10, and a plurality of bars or segments 11 that are clamped in position between the V-projections by means of bolts 12. The bushing 7 is mounted directly on the shaft 5, while the clamping ring 9 is mounted on an annular projection 13 with which the bushing is provided. A wiper-ring 14 is mounted on the shaft and abuts against the end of the bushing 7. The ring 14 is provided with a flange 15, in the usual manner, which extends under a projecting flange 16 on the bearing housing 2 so that any excess lubricating fluid which may escape from the inner end of the bearing will be carried out to the end of the flange 15 and thrown off against the projection 16, by centrifugal force.

The heads of the bolts 12 which clamp the rings 19 to the bushing 7, when the commutator is assembled, have the usual square or hexagonal form and are so arranged, when the commutator is properly clamped, that one side face of each bolt-head is tangent to a cylinder or drum concentric with the shaft. The wiper-ring 14 is provided with a cylindrical projection 17 the surface of which is adapted to fit closely against the nut-heads when they are disposed, as above indicated. The wiper-ring is pressed into position after the commutator is assembled and properly placed on the shaft, and, consequently, it is impossible for the bolts to work loose, since the adjacent surface of the wiper-ring prevents their turning.

It is conceivable that structural modifications may be effected within the spirit and scope of my invention, and I desire that only such limitations shall be imposed as are indicated in the appended claims.

I claim as my invention:

1. In a dynamo-electric machine, the combination with a rotatable armature and a commutator cylinder comprising a plurality of segments, and clamping rings and bolts for fastening the rings together, of means forming a part of the rotatable member for locking the clamping bolts.

2. The combination with a stationary frame, a rotatable member having clamping bolts arranged with their center lines parallel to the axis of rotation, of means comprising an annular member having a cylindrical surface for locking the bolts against independent rotation.

3. In a dynamo-electric machine, the combination with a rotatable armature and a commutator cylinder comprising a plurality of segments, clamping rings therefor and bolts for fastening the rings together, said bolts being arranged with their center lines equi-distant from the axis of rotation of the armature and parallel thereto, of an annular member substantially concentric with the clamping rings having a cylindrical surface adapted to engage the inner side faces of the nuts and to prevent their independent rotation.

4. In a dynamo-electric machine, the combination with a stationary frame and bearing housings, a rotatable armature comprising a shaft, a commutator cylinder having coöperating V-rings, and clamping bolts disposed with their center lines parallel to the axis, of a wiper-ring secured to the shaft, said ring having an annular projection which prevents the independent rotating of the bolts.

5. The combination with stationary bearings, a shaft rotatably mounted therein, and a commutator cylinder mounted on the shaft, of axially disposed clamping bolts for the cylinder, and a wiper-ring mounted on the shafts for deflecting excess lubricating fluid from the commutator and for locking the clamping bolts.

In testimony whereof, I have hereunto subscribed my name this 30th day of Sept., 1908.

JOSEPH D. FORRER.

Witnesses:
H. E. DYCHE,
BIRNEY HINES.